United States Patent [19]

Murai et al.

[11] 4,342,897
[45] Aug. 3, 1982

[54] RECOVERY TYPE FLUX FEEDING ASSEMBLY

[75] Inventors: Ryuji Murai, Fujisawa; Toshihiko Watanabe, Kamakura; Yoji Ogata, Fujisawa; Masashi Nagashima; Mitsurou Soga, both of Kamakura, all of Japan

[73] Assignee: Kobe Steel, Limited, Kobe, Japan

[21] Appl. No.: 116,202

[22] Filed: Jan. 28, 1980

[51] Int. Cl.³ .................... B23K 9/18; B04C 3/00; B04C 9/00; B01D 45/16

[52] U.S. Cl. ............................ 219/73.2; 209/144; 55/459 R; 219/73.21

[58] Field of Search .............. 219/73, 73.2, 73.21; 209/144; 55/459 R

[56] References Cited

U.S. PATENT DOCUMENTS

| | | | |
|---|---|---|---|
| 2,269,538 | 1/1942 | Lewbers | 219/73 R X |
| 2,390,560 | 12/1945 | Stanley et al. | 219/73.2 |
| 2,471,326 | 5/1949 | Hoyt, Sr. | 209/144 |
| 2,690,493 | 9/1954 | Schaefer | 209/144 X |
| 2,766,360 | 10/1956 | Landis et al. | 219/73 R |
| 2,837,172 | 6/1958 | Klein et al. | |
| 2,890,764 | 6/1959 | Arnold | 209/144 X |
| 3,305,663 | 2/1967 | Jansen | 219/73.21 X |
| 3,323,647 | 6/1967 | Ogden et al. | 219/73 R X |
| 3,643,853 | 2/1972 | Hiller | |
| 3,804,245 | 4/1974 | Pendleton | 219/73.2 X |
| 3,898,415 | 8/1975 | D'Acremont | 219/73.21 X |
| 3,926,788 | 12/1975 | Stephens et al. | 219/73.2 X |

FOREIGN PATENT DOCUMENTS

| | | | |
|---|---|---|---|
| 42-04129 | 2/1967 | Japan | 219/73.2 |
| 51-117940 | 10/1976 | Japan | 219/73.2 |

*Primary Examiner*—Gene Z. Rubinson
*Assistant Examiner*—Keith E. George
*Attorney, Agent, or Firm*—Oblon, Fisher, Spivak, McClelland & Maier

[57] ABSTRACT

A recovery type flux feeding assembly is disclosed. The assembly includes a virgin flux hopper and a waste flux hopper with a flux feed conduit connected to the bottom of the waste flux hopper. The hoppers are separated by a drop stop which selectively permits flux from the virgin flux hopper to enter the waste flux hopper so that the flux exiting through the flux feed is a mixture of the two. A flux return assembly consists of a flux recovery port positioned adjacent the waste flux from the weld, a cyclone attached to the top of the waste flux hopper and a conduit connecting the two. An air injector injects air into a midpoint of the conduit between the flux recovery port and the cyclone so that the cyclone is kept at a positive pressure and the waste flux therein is not sucked out. Conduits are included between the tops of the hoppers for equalizing the pressures therebetween. In one embodiment, the virgin flux hopper surrounds and is entirely above the waste flux hopper while in another embodiment the two are adjacent and on substantially the same level.

8 Claims, 5 Drawing Figures

RECOVERY TYPE FLUX FEEDING ASSEMBLY

BACKGROUND OF THE INVENTION

1. Field of the Invention

This invention relates to a recovery type flux feeding assembly, and more particularly to a device for recovering and feeding flux for latent arc welding.

2. Description of the Prior Art

Latent arc welding generally involves spreading flux over a weld zone and allowing welding to take place within the flux. When this occurs, approximately one third of the overall spread flux is fused and slagged while the remaining two thirds is in a recyclable state which may be recovered for future welding.

Various attempts have been made for such a recovery type flux feeding device. For instance, some of them are disclosed in Japanese Patent Publication No. 42/4129 and Japanese Patent Application No. 51/117940.

A common problem with those prior art assemblies was their inability to insert flux when mounted on the tip of a manipulator boom for carrying out welding inside of an area of relatively small dimensions, for example, a pipe.

SUMMARY OF THE INVENTION

With the foregoing in mind, the inventors have succeeded in developing a compact flux feeding assembly of the recovery type similar in size to a welding head. In light of the fact that the amount of recovered flux is insufficient for welding, it is an object of the present invention to provide a flux feeding assembly in which virgin flux is supplied and flux is not stirred up in supplying the virgin flux where the grain size of the flux is small.

In order to accomplish the above discussed object, the present invention provides a recovery type flux feeding assembly including an air ejector connected to a flux recovery hose, a cyclone separator connected to the ejector to cause a cyclonic flow in a mixed flux and air flow conveyed thereto from the ejector and separate to it into air and waste flux, a waste flux hopper communicated with the cyclone separator, a virgin flux hopper separate from the waste flux hopper, a drop stop disposed at a joint between the virgin flux hopper and the waste flux hopper to prevent virgin flux from freely falling into the waste flux hopper, a connection tube disposed between the two hoppers to keep the pressures of the two hoppers in balance, and a flux feed hose connected to the waste flux hopper.

As a second feature of the present invention, a valve is disposed at a joint between the separator and the hopper.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
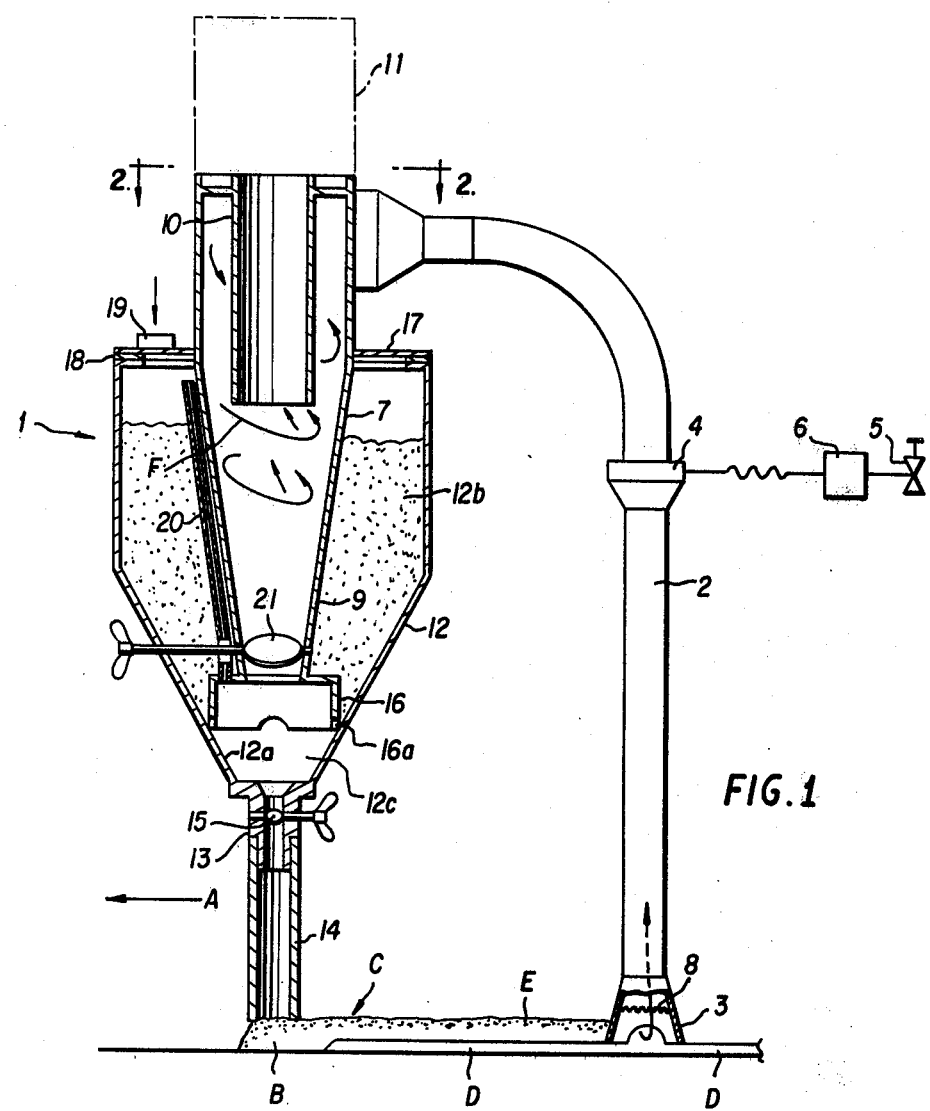
FIG. 1 is a front view partly in cross section of a first embodiment of the present invention.
Figure 2:
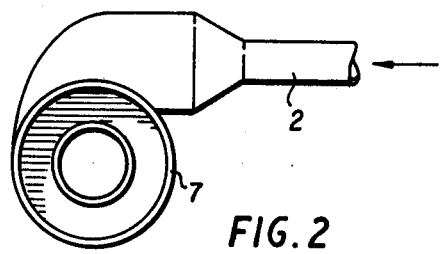
FIG. 2 is a plan view of a part of FIG. 1 along the line 2—2.
Figure 3A:
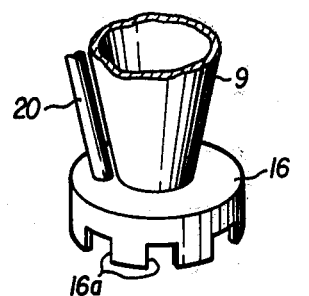
FIGS. 3(a) and 3(b) are perspective views of two examples of a drop stop.
Figure 3B:
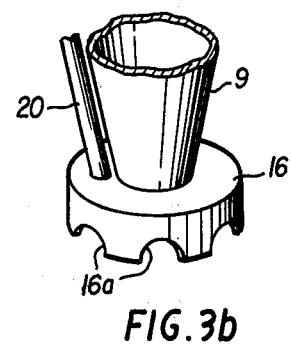

Referring to FIGS. 1 and 2, there is illustrated an embodiment of the present invention, generally denoted as (1), which is mounted on the tip of a manipulator boom (not shown) for travel in the direction of the arrow (A) in FIG. 1.

A recovery hose (2) has a horn shaped recovery port (3) at its one end and an air ejector (4) at a middle point. The air ejector (4) is connected via a stop valve (5) and a pre-processor (6) to an air source installed in a factory.

As shown in FIG. 2, the recovery hose (2) is eccentrically connected to the upper end of a cyclone separator (7). A filter (8) is secured within the recovery port (3) for the removal of slag. The cyclone separator (7) is of a cylindrical shape of which the lower half includes a vertical funnel (9). An exhaust pipe (10) having at its upper end a filter (11) is concentrically contained within the upper half of the cyclone separator (7).

A hopper (12) is provided at its lower half with a funnel of which the tip is connected via a connector (13) to a supply hose (14), the connector (13) carrying a supply adjustment valve (15). The hopper (12) surrounds the axial center of the cyclone separator (7) where a drop stop (16) is disposed at a lower level with its lowest edge abutting an inner wall of the funnel (12a) of the hopper (12).

The drop stop (16) has a bowl shaped cross section and a joint section (16a) including semicircular or semi-rectangular cutouts equally and circumferentially spaced about its periphery. The hopper (12) is divided into a virgin flux hopper (12b) surrounding the cyclone separator (7) and a waste flux hopper (12c) contained in the funnel below the drop stop (16), both of which are open to each other via the joint section (16a). The waste flux hopper (12c) forms a mixing chamber for mingling waste flux and virgin flux. A hopper lid (17) is detachable from the hopper (12) via a packing (18) and has a virgin flux inlet (19) formed therein which is open to the atmosphere.

Figure 4:
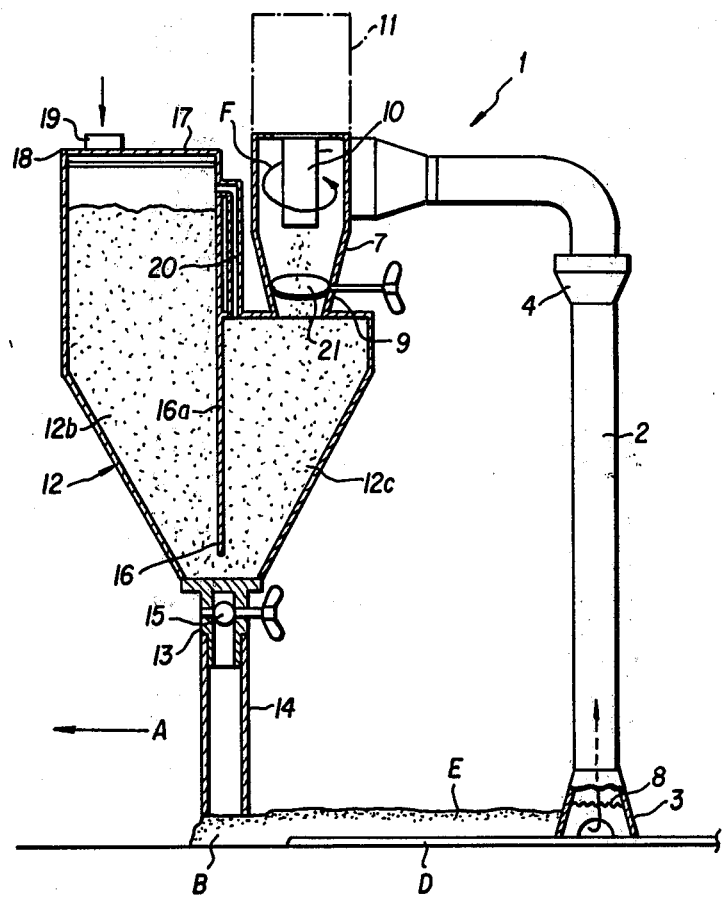
FIG. 4 is a front view partly in cross section of a second embodiment of the present invention.

Although in the embodiment of FIG. 1 the cyclone separator (7) is concentrically inserted within the hopper (12) in order to define the virgin flux hopper (12b) about the waste flux hopper (12c), it is obvious that as suggested in the embodiment of FIG. 4 a longitudinal partition may be established at the center of the hopper (12) to define the waste flux hopper (12c) and the virgin flux hopper (12b) adjacent to each other. In this case a lower portion of the longitudinal partition serves as the drop stop (16) carrying the joint section (16a), and the cyclone separator (7) is mounted about the hopper (12c). The construction of FIG. 4 is substantially similar to that of FIG. 1 wherein similar parts are indicated by the same reference numbers. In the embodiment of FIG. 4, the hopper (12b) is at a higher level than the hopper (12c) and the cyclone separator (7) is lodged in a dead space corresponding to such a level differential.

A connection tube (20) is disposed between an upper portion of the hopper (12c) and the counterpart of the hopper (12b) to bring the pressures of the two hoppers (12c) and (12b) into balance. In the embodiment of FIG. 1, the connection tube (20) is connected to the bowl shaped drop stop (16), with its upper end leading to an upper portion of the hopper (12b).

Meanwhile, in the second embodiment of FIG. 4, the connection tube (20) is disposed between the top of the hopper (12c) and an upper shell of the hopper (12b) and is outside the hoppers. A valve (21) is disposed at a joint between the cyclone separator (7) and the hopper (12c).

The reason that the valve (21) is disposed at the joint between the separator (7) and the hopper (12c) in the embodiment of FIG. 1 is due to the fact that air would otherwise escape from the joint section (16a) of the drop stop (16) to produce difficulties in bringing the internal pressure of the virgin flux hopper (12b) into balance with the atmosphere.

The above described device according to the present invention will recover and supply flux in the following manner.

When the device according to the present invention is mounted upon the tip of a manipulator boom (not shown) and driven in the direction of the arrow (A), flux is spread over a weld zone or area (B) through the supply hose (14). Welding takes place within a layer (C) of flux. Approximately one third of the overall spread flux is fused into slag (D) whereas the remaining two thirds of the flux is still in a recyclable state.

Since the recovery port (3) of the recovery hose (2) is open to the flux (E) and the air ejector (4) is installed within the recovery hose (2), the waste flux (E) is drawn from recovery port (3) and forced under pressure into the cyclone separator (7). The suction force necessary to draw the flux from the recovery port (3) to the air ejector is provided by the vacuum created by the movement of the air from the air ejector into the cyclone 7. When this occurs, the filter (8) within the recovery port (3) prevents passage of rough flux, slag, etc. but permits recovery of only the recyclable flux.

As depicted by the arrow (F) in FIGS. 1 and 4, the separator (7) creates cyclonic flows in a mixed flux and air stream conveyed into the cyclone separator (7) via the ejector (4) either under pressure or not such that flux of a greater mass is subjected to centrifugal force and drops gradually and air and fine flux rise through the exhaust pipe (10). As a result, the cyclonic movement assures the separation of the flux and air.

Since the recovered waste flux is conveyed under pressure through the air ejector (4) prior to circulation into the hopper (12c), the hopper (12c) is neither subjected to a reduced pressure state nor is air drawn from the supply hose (14), unlike a conventional vacuum suction type flux circulator. It is therefore possible to shorten the supply hose (14) and reduce the height of the overall device to a minimum since the air ejector (4) is installed in the middle of the recovery hose (2).

The waste flux which is separated from air by the cyclone separator (7) falls into the hopper (12c), in the absence of the valve (21). In the presence of the valve (21), on the other hand, the flux is allowed to fall into the hopper (12c) only when the valve (21) is open. While welding goes on, the absolute amount of flux diminishes progressively. Since the virgin flux hopper (12b) is installed in addition to the waste flux hopper (12c), the hopper (12c) is replenished with virgin flux. The drop stop (16) properly adjusts the amount of the replenishment and produces a homogeneous mixture of the waste flux and virgin flux.

When the mixed flux and air stream is conveyed under pressure into the separator (7) by the action of the air ejector (4), a pressure differential occurs between the respective hoppers (12b) and (12c). Particularly, in the case of flux containing dust it is desirable that air does not escape from hopper (12c) through the flux particles to stir up virgin flux. The connection tube (20) connected between the two hoppers (12b) and (12c) is effective to bring the internal pressures of the hoppers into balance and prevent the flux from being stirred up. It will be noted that there is no trend for flux containing no dust to be stirred up due to air passing among the flux particles.

In some cases difficulties are encountered in inserting the virgin flux into the hopper (12b) during welding since the mixed flux and air stream is conveyed under pressure by the air ejector (4). These difficulties are severe when the grain size of the flux is relatively small.

According to the present invention, the valve (21) is closed under these circumstances so that virgin flux may be introduced via the inlet (19) into the hopper (12c) while the internal pressure of the hopper is maintained equal to atmospheric pressure to free it from stirring up problems. After the completion of introduction of a given amount of flux, the valve 21 is placed into an open position. Latent arc welding therefore can be carried out on a continuous basis.

Moreover, the illustrated embodiment of the present invention enables the height of the overall device to be minimized since the cyclone separator (7) is concentrically disposed within the hopper (12). The size of the overall device can be further reduced by disposing the two hoppers (12b) and (12c) adjacent to each other. More particular, in the case where the cyclone separator is concentric with the virgin flux hopper, the outlet of the cyclone separator, the waste flux hopper and the connector are concentrically connected in an elongated direction. As a rule, flux flows out from an outlet of a hopper having a funnel at its lower portion in a manner such that only a central portion about the hopper axis first falls, up to its surface layer, and then a peripheral portion thereof follows. Accordingly, the waste flux recovered and separated acquires flow priority at all times and the drop stop at the cyclone outlet serves to supply and spread an amount of virgin flux equal to the deficiency of waste flux. Since welding takes place while virgin flux is being supplied, the virgin flux has good effects on the grain size distribution of the recovered fine waste flux.

Flux for the welding of high grade steel generally requires drying prior to welding. Pre-fused flux after being used for welding turns into the equivalent of the dried flux discussed above due to welding heat. It is therefore desirable for welding, to recover and preferentially spread the waste flux. However, in the case where the hoppers are disposed contiguously as indicated in FIG. 4, it is somewhat difficult to preferentially supply the waste flux from a standpoint of the outlet position of the cyclone separator.

When the cyclone separator is disposed concentrically with the virgin flux hopper, virgin flux flows from the entire circumference into the waste flux hopper connected to the outlet of the cyclone separator while mixing and spreading virgin flux and waste flux. This behavior is favorable for gaining a uniform and homogeneous mixture of virgin flux and waste flux.

It is well known that the cyclone separator should create an elongated cyclone jet and be of a large outer diameter in order to assure a higher degree of separation performance. In this case, the overall device is greater in height than width. In the case where a higher performance cyclone separator is to be employed, the contiguous alignment of FIG. 4 would be somewhat greater in outer diameter than the coaxial alignment of FIG. 1.

As stated above, according to the primary feature of the present invention, the combined flux and air flow is conveyed with or without pressure into the separator for the recovery of waste flux so that the supply hose may be shortened and the height of the overall device be reduced because of the air injector. The use of the cyclone separator assures accurate separation into flux and air.

Even when the combined flux and air flow is conveyed under pressure, the connection tube keeps the pressures of the respective hoppers in balance and thus prevents flux from being stirred up. The drop stop properly adjusts the amount of replenishment of virgin flux. In addition, a secondary feature of the present invention is that the valve 21 in the closed position assures the smooth introduction of virgin flux in the hopper (12c). In any case, the recovery type flux feeding assembly of the present invention is very beneficial in latent arc welding.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A recovery type flux feeding assembly comprising:
a virgin flux hopper;
a waste flux hopper operatively associated with said virgin flux hopper;
flux feed means connected to said waste flux hopper for feeding flux to a weld area and positioned above said weld area;
flux return means connected to said waste flux hopper for returning excess flux from said weld area to said waste flux hopper;
means for selectively permitting flux from said virgin flux hopper to enter said waste flux hopper, said means comprising a virgin flux drop stop positioned between said hoppers and adjacent said flux feed means; and
pressure equalization means interconnecting said virgin flux hopper and said waste flux hopper for equalizing pressure therebetween, whereby a mixture of said virgin flux and said waste flux enters said flux feed means.

2. The assembly of claim 1, said flux return means further comprising a cyclone wherein said virgin flux hopper surrounds and is located above said waste flux hopper and wherein said drop stop comprises a partition between the bottom of said virgin flux hopper and said waste flux hopper, said partition including apertures formed therein whereby the virgin flux can flow into said waste flux hopper.

3. The assembly of claim 2 wherein said pressure equalization means is a conduit extending from said drop stop to the top of said virgin flux hopper.

4. The assembly of claim 1 wherein said hoppers are adjacent one another and said drop stop comprises a partial partition between said hoppers and extending from the point of intersection of said hoppers downwards to a point adjacent said flux feed means.

5. The assembly of claim 4 wherein said pressure equalization means comprises a conduit from the top of said waste flux hopper to a point adjacent the top of said virgin flux hopper.

6. A recovery type flux feeding assembly comprising:
a virgin flux hopper;
a waste flux hopper operatively associated with said virgin flux hopper;
flux feed means connected to said waste flux hopper for feeding flux to a weld area from said waste flux hopper and said virgin flux hopper;
a flux recovery port positioned adjacent said weld area;
a cyclone communicating with the top of said waste flux hopper;
pressure equalization means interconnecting said virgin flux hopper and said waste flux hopper for equalizing pressure therebetween;
a conduit connecting said flux recovery port and said cyclone; and
air ejector connected to a midpoint of said conduit for supplying air to said cyclone and creating a vacuum between said midpoint and said flux recovery port,
whereby said cyclone is maintained at positive pressure.

7. The assembly of claim 6 including a valve located between said waste flux hopper and said cyclone.

8. The assembly of claim 6 including means for selectively permitting flux from said virgin flux hopper to enter said waste flux hopper.

* * * * *